United States Patent [19]
Nakamura et al.

[11] 3,903,178
[45] Sept. 2, 1975

[54] METHOD FOR PREPARING 2-NITRO-4,6-DICHLORO-5-METHYLPHENOL

[75] Inventors: Susumu Nakamura; Daijiro Nishio, both of Odawara; Yukio Yokota, Minami-Ashigara, all of Japan

[73] Assignee: Fuji Photo Film Co., Ltd., Minami-Ashigara, Japan

[22] Filed: Apr. 5, 1972

[21] Appl. No.: 241,376

[30] Foreign Application Priority Data
Apr. 7, 1971  Japan.............................. 46-21617

[52] U.S. Cl...... 260/622 R; 260/512 R; 260/562 B; 260/575
[51] Int. Cl.$^2$.................... C07C 37/00; C07C 37/04
[58] Field of Search............ 260/575, 512 R, 622 R, 260/623 H, 628, 622

[56] References Cited
UNITED STATES PATENTS

| | | | |
|---|---|---|---|
| 2,176,010 | 10/1939 | Mills.............................. | 260/623 H |
| 2,325,753 | 8/1943 | Dolt et al......................... | 260/622 R |
| 2,523,707 | 9/1950 | Miller.............................. | 260/628 |
| 2,629,745 | 2/1953 | Gilbert et al................. | 260/623 H X |
| 2,693,487 | 11/1954 | Swisher........................... | 260/628 X |
| 3,108,927 | 10/1963 | Pyne.............................. | 260/622 R |

OTHER PUBLICATIONS
General Chemical Comp. "Sulfan–Sulfuric Anhydride," p. 4, (1947).

*Primary Examiner*—Bernard Helfin
*Assistant Examiner*—Norman Morgenstern
*Attorney, Agent, or Firm*—Sughrue, Rothwell, Mion, Zinn and Macpeak

[57] ABSTRACT

A method for preparing 2-nitro-4, 6-dichloro-5-methylphenol and the corresponding 2-amino compound comprising sulfonating 4-chloro-5-methylphenol with a sulfuric anhydride complex in a halogenated hydrocarbon solvent, chlorinating the thus obtained 2-sulfo-4-chloro-5-methylphenol, replacing the sulfonic group of the resulting 2-sulfo-4, 6-dichloro-5-methylphenol with a nitro group and, when the 2-amino compound is required, reducing the nitro group to the amino group is disclosed.

The product is useful as an intermediate in preparing a cyan coupler.

11 Claims, No Drawings

METHOD FOR PREPARING 2-NITRO-4,6-DICHLORO-5-METHYLPHENOL

BACKGROUND OF THE INVENTION

1. Field of the Invention

The present invention relates to a method for preparing 2-nitro-4, 6-dichloro-5-methylphenol. 2-Amino-4, 6-dichloro-5-methylphenol hydrochloride, which is prepared using a conventional method of reducing the 2-nitro-4, 6-dichloro-5-methylphenol followed by the salt formation thereof, is a useful compound as an intermediate in the preparation of a cyan coupler.

2. Description of the Prior Art

Hithertofore, 2-amino-4, 6-dichloro-5-methylphenol hydrochloride has been prepared according to the method disclosed in U.S. Pat. No. 2,801,171. In this known method, 4-chloro-5-methylphenol (I) is nitrated with nitric acid in glacial acetic acid to produce 2-nitro-4-chloro-5-methylphenol (II) which is then catalytically reduced in the presence of a Raney nickel catalyst under pressure in dioxane or tetra-hydrofufran followed by acetylation of the resulting 2-amino-4-chloro-5-methylphenol (III) with acetic anhydride to obtain 2-acetoamino-4-chloro-5-methylphenol (IV). The isolated compound (IV) is then chlorinated in glacial acetic acid with sulfuryl chloride to produce 2-acetoamino-4, 6-dichloro-5-methylphenol (V) which is finally heated with concentrated hydrochloric acid to obtain the desired compound, 2-amino-4, 6-dichloro-5-methylphenol hydrochloride (VI). The reaction scheme of this above known method can be illustrated as follows:

However, the above described method has many disadvantages. First, the yield of the desired compound is extremely low; i.e., the yield of the compound (II) from the compound (I) in the first nitration step is only 40%, the yield of the compound (IV) from the compound (II) is 85%, the yield of the compound (VI) from the compound (IV) is 80%, the total yield of the desired compound 2-amino-4, 6-dichloro-5-methylphenol hydrochloride (VI) from the raw material 4-chloro-5-methylphenol (I) being 27%. Second, the isomer having a nitro group at the 6-position is produced in the nitration step in substantially the same amount as that of the desired compound so that the isolation of the desired compound is required in order to remove the isomer as a by-product. Third, the sulfuryl chloride used in the chlorination step, (IV) (V), is expensive and, because of its low boiling point, tends to escape from the reaction system where the reaction is carried out near the boiling point thereby leaving unreacted material which is difficult to remove. As a result, the final product contains mono-chloro form. Further, the above known method is disadvantageous in that sulfur dioxide gas, which is objectionable as a waste gas, is generated, and, moveover, an acetylation step as a pretreatment is necessary to protect an amino group. Finally, an expensive solvent such as dioxane, tetrahydrofuran and the like must be employed in the reducing step since alcohols commonly employed in a reaction of this type cannot be used as a solvent since an acetylation with acetic anhydrate must be conducted as a subsequent step. Additionally, in accordance with the above known method, the intermediate products must be isolated after each of the nitration and acetylation steps.

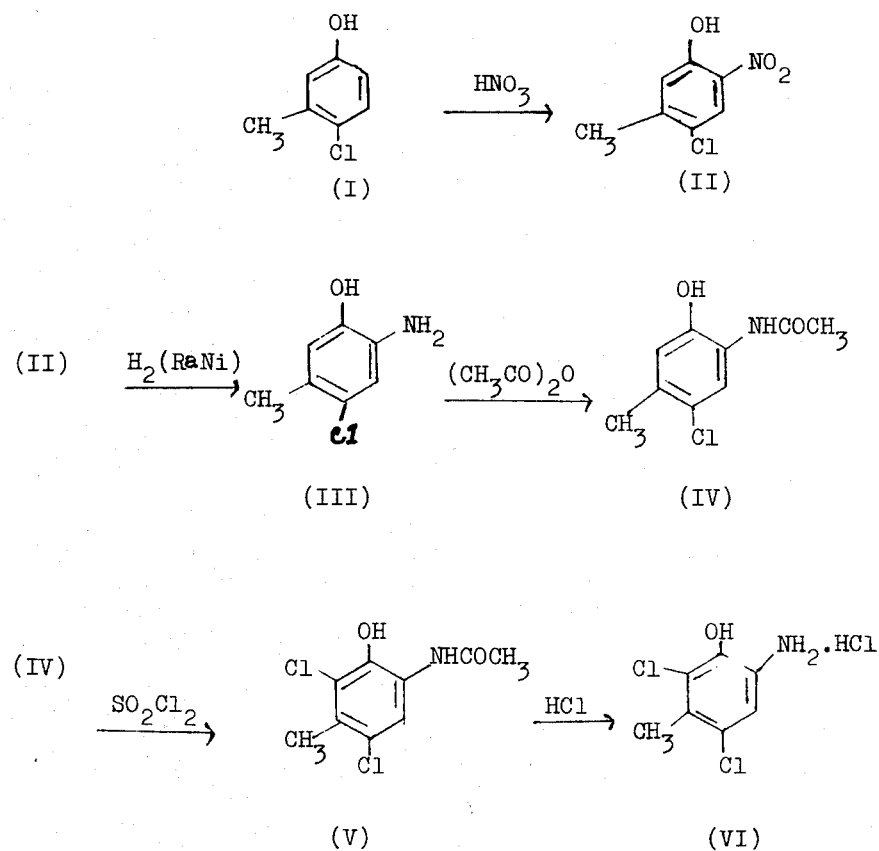

An object of the present invention, therefore, is to provide a method for preparing 2-amino-4, 6-dichloro-5-methylphenol hydrochloride easily in a high yield.

Another object of the present invention is to provide a method for preparing 2-amino-4, 6-dichloro-5-methylphenol hydrochloride economically.

A further object of the present invention is to provide 2-amino-4, 6-dichloro-5-methylphenol hydrochloride.

SUMMARY OF THE INVENTION

As a result of various investigations to eliminate the above described disadvantages associated with the conventional method for preparing 2-amino-4, 6-dichloro-5-methylphenol hydrochloride a novel and useful method for preparing 2-amino-4, 6-dichloro-5-methylphenol hydrochloride from 4-chloro-5methylphenol as a starting material has been found.

The method of this invention comprises sulfonating 4-chloro-5-methylphenol with a sulfuric anhydride complex in a halogenated hydrocarbon solvent, chlorinating the thus obtained 2-sulfo-4-chloro-5-methylphenol followed by replacing the sulfonic group of the resulting 2-sulfo-4, 6-dichloro-5-methylphenol with a nitro group to provide 2-nitro-4, 6-dichloro-5-methylphenol.

DETAILED DESCRIPTION OF THE INVENTION

The halogenated hydrocarbon solvent employed in the sulfonation step of this invention includes, for example, halogenated hydrocarbon solvents such as methylene chloride, chloroform, carbon tetrachloride, dichloroethane, trichloroethylene, tetrachloroethane, tetrachloroethylene, methylchloroform, dibromoethane, trichlorofluoroethane, bromoethane and the like. The amount of the solvent used is not critical and can vary. All that is required is that there be sufficient amount to dissolve the 4-chloro-5-methylphenol.

The sulfuric anhydride complex employed in the present invention may be one of the known sulfuric anhydride complexes which can be exemplified by those complexes of sulfuric anhydride with dioxane, triethylamine or pyridine. Where the complex of sulfuric anhydride and dioxane is used, the complexes having a molar ratio sulfuric anhydride to dioxane ranging from 1:1 to 2:1 can be used with a molar ratio of 2:1 being particularly preferred. It is advantageous to use the sulfuric anhydride in above equimolar amounts, for example, from about 1 to about 1.5 times, on a molar basis the amount of 4-chloro-5-methylphenol. The reaction rate will vary depending upon the reaction temperature and a temperature up to the boiling point of the solvent employed can be used. It is preferred to carry out the reaction at a temperature above 60°C. An especially preferred temperature range is about 70°C to 75°C. The time of reaction will depend on the temperature, ratio of reactants, etc., but generally will range from several tens of minutes to about several hours. The reaction conditions can be easily determined by one skilled in the art.

The chlorination step is effected subsequently to the sulfonation step and can be carried out using any of the conventional procedures such as by passing chlorine gas into the reaction solution or by reaction with sulfuryl chloride. Where chlorine gas is used, it is preferable to maintain the reaction temperature below about 60°C, e.g., from about room temperature, about 20°C, to below about 60°C, preferably in the range of approximately 45° to 55°C, since higher temperatures will result in the formation of byproducts. The amount of reactants, i.e., the chlorinating agent and the phenol prepared in step one can range from about equimolar amounts to greater than equimolar amounts. A molar ratio of about 1.5 moles of chlorinating agent to each mole of phenol generally is used from a practical standpoint. Larger amounts can be used but this is not preferred from a cost standpoint. When chlorine gas is employed use of an amount of from about one to two times the theoretical amount on a molar basis has been found advantageous. Similar solvents to those used in the sulfonation step can be employed and generally chlorination is carried out on the reaction product as obtained in the sulfonation step.

After completion of the chlorination, the reaction mixture is poured into water whereby the desired compound is transferred to the aqueous phase. In this manner, the impurities contained in the reaction mixture can be removed.

The replacement of sulfonic group by the nitro group is carried out using conventional techniques, for example, by adding nitric acid to the aqueous extract obtained above. Although other materials such as $NO_2$ gas can be used, these are not preferred because of waste exhaust gas pollution problems. The reaction temperature can vary and where nitric acid is used the reaction temperature generally will range from about room temperature to about 50°C. Higher temperatures are not preferred because of waste gas problems. The molar ratio of reactants which is suitable can range from about 1:1 to about 1:2.5, preferably from about 1:1.3 to about 1:1.7 mole per mole of phenol. When nitric acid is used a molar ratio of one to two times the theoretical amount on a molar basis has also been found advantageous. Since the sulfonated phenol upon which the sulfo group is replaced by a nitro group is soluble in water, while the nitro phenol is less soluble in water, water is a preferred reaction medium. Where water is used a suitable amount of phenol can range from about 0.5 mole/l liter to about 1 mole/l liter of water. Greater amounts of water can be used but are not preferred since yield is reduced.

An embodiment for the preparation of 2-amino-4, 6-dichloro5-methylphenol hydrochloride according to the method of this invention can be illustrated as follows. The starting material, the 4-chloro-5-methylphenol, is a well known material and is commercially available.

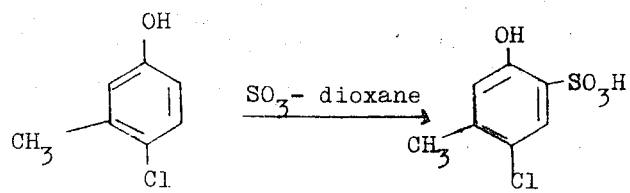

(I)         (VII)

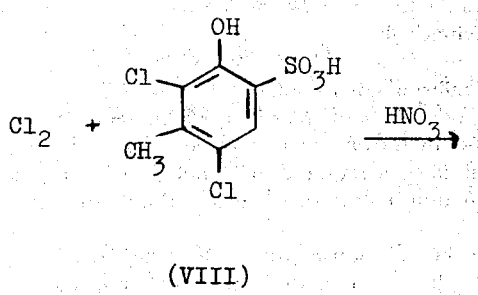

(VIII)

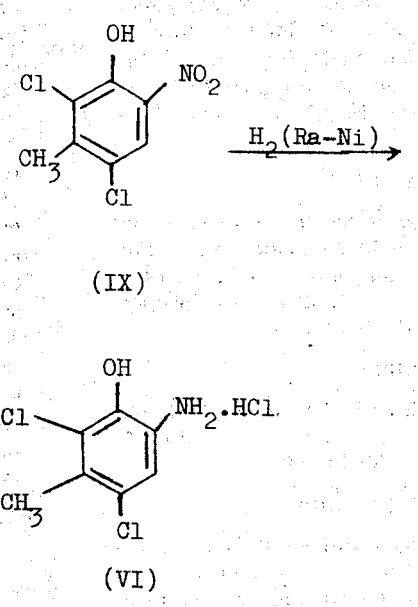

(IX)

(X)

(VI)

In the above embodiment, any one of the conventional processes for the conversion of a nitro group to an amino group such as using iron/glacial acetic acid, palladium/charcoal, and the like, using conventionally employed solvents such as lower alcohols, e.g., methanol, ethanol, propanol and the like, ethers such as tetrahydrofuran, dioxane, and glacial acetic acid for these methods can be used for the reduction of 2-nitro-4, 6-dichloro-5-methylphenol (IX) to 2-amino-4, 6-dichloro-5-methylphenol (X) and for the conversion of the compound (X) to the desired compound, 2-amino-4, 6-dichloro-5-methylphenol hydrochloride (VI). Other salts such as the sulfate and the nitrate can be formed, but the hydrochloride salt is preferred where the product is to be used as an intermediate in preparing cyan couplers since the hydrogen chloride can be readily removed. In accordance with the method of this invention, the yield of the final product (VI) from the raw material (I) has been found to be above 60% which is more than two times the yield in comparison with that of the conventional method. Further, the formation of the isomer tends to be minimized due to the fact that the nitration according to the method of this invention is conducted by replacing the selectively introduced sulfonic group by a nitro group. Also, the thus obtained nitrated products can be reduced more easily than the nitrated products obtained using the conventional method. In addition, since the chlorinating agent used in the present invention can be low cost chlorine gas, the waste gas is hydrogen chloride gas which is less troublesome than sulfur dioxide of the prior process. The unreacted monochloro byproduct can be separated in the salt formation step after the reduction since the salt is easily soluble in alcohol. In addition to the above, the method of this invention is advantageous in that cheap alcohols can be used as the solvents employed in the reduction step and that it is not necessary to isolate intermediates from the first step to the nitration step.

For chlorination of cresols via sulfonation, a procedure comprising a chlorination using chlorine gas in nitrobenzene after sulfonation with fuming sulfuric acid is known. However, this known procedure is not suitable to the chlorination and sulfonation of 4-chloro-5-methylphenol, since it requires an excessively large amount of fuming sulfuric acid and also requires expensive nitrobenzene which is not suitable for large scale production for economic reasons. On the contrary, the method of the present invention is advantageous in that the sulfuric anhydride used as a sulfonating agent can be used in an equimolar amount, and that inexpensive chlorinated solvents may be used. The following facts demonstrate that the method of the present invention is superior to and would not thought to be possible from the above conventional method. That is, mere substitution of sulfuric anhydride for fuming sulfuric acid in the sulfonation of the above conventional method cannot be used from a practical standpoint since it results in an excessively colored reaction system, and the use of dichloroethane instead of nitrobenzene in the conventional method is very unsatisfactory since the reaction essentially does not proceed.

The present invention will be illustrated in greater detail by reference to the following examples, but they are not to be construed as limiting the present invention.

EXAMPLE 1

A four-necked flask was charged with 250 ml of 1,2-di- chloroethane and 35.2 g of dioxane, and 30 ml of sulfuric anhydride was added dropwise thereto while holding the temperature to below 25°C. To the resulting mixture was then added all at once 71.3 g of 4-chloro-5-methylphenol followed by holding at 70°C with stirring for one hour. Chlorine gas in an amount of approximately 1.5 times the theoretical amount was then passed into the mixture while keeping the mixture at 50°C. After completion of the passing of the chlorine gas, stirring was continued for 1 hour, and the reaction mixture was poured into 500 ml of water, stirred for 1 hour and allowed to stand. The lower solvent layer was removed, and 62.2 g of 75% nitric acid was added dropwise to the aqueous layer with stirring at 25°–50°C.

to precipitate 2-nitro-4, 6-dichloro-5-methylphenol. The thus obtained crystals were collected by filtration, washed with water and dried. Yield 78 g (70%), melting point 85.7°–86.5°C. Analysis: Found H: 2.17%, C: 38.20%, N: 6.02%, Calculated H: 2.25%, C: 37.83%, N: 6.31%.

EXAMPLE 2

In a same manner as described in Example 1, but using 250 ml of 1,1,2,2-tetrachloroethane, 35.2 g of dioxane, 27.5 ml of sulfuric anhydride and 71.3 g of 4-chloro-5-methylphenol, 2-nitro-4,6-dichloro-5-methylphenol was obtained. Yield: 67%.

EXAMPLE 3

In a same manner as described in Example 1, but using 61.3 g of dioxane, 2-nitro-4,6-dichloro-5-methylphenol was obtained. Yield: 68%.

REFERENCE EXAMPLE 1

A 2l-autoclave was charged with 600 ml of isopropyl alcohol, 111 g of 2-nitro-4,6-dichloro-5-methylphenol and 5 g of Raney nickel and the stirring was continued until the theoretical amount of hydrogen was absorbed at an initial hydrogen pressure of 10 kg/cm$^2$ below 50°C. The reaction mixture was filtered to separate the Raney nickel catalyst. To the filtered solution was added dropwise 63 g of concentrated hydrochloric acid with stirring to precipitate white crystals. The crystals were collected by filtration, washed with isopropyl alcohol and dried to give 107 g of 2-amino-4,6-dichloro-5-methylphenol hydrochloride. Yield: 94%.

REFERENCE EXAMPLE 2

In a same manner as described in Reference Example 1 but using 500 ml of methanol, 55.5 g of 2-nitro-4,6-dichloro-5-methyl-phenol and 5 g of Raney nickel and hydrogenchloride gas, on salt formation, 2-amino-4,6-dichloro-5-methyphenol hydrochloride was obtained. Yield: 80%.

What is claimed is:

1. A method for preparing 2-nitro-4,6-dichloro-5-methylphenol which comprises the steps of
    sulfonating 4-chloro-5-methylphenol with a sulfuric anhydride complex in a halogenated hydrocarbon solvent at a temperature below the boiling point of the halogenated hydrocarbon solvent to obtain 2-sulfo-4-chloro-5-methylphenol, said sulfuric anhydride complex being employed in a molar amount of from 1 to 1.5 times the amount of 4-chloro-5-methylphenol;
    chlorinating said 2-sulfo-4-chloro-5-methylphenol with chlorine gas to obtain 2-sulfo-4,6-dichloro-5-methylphenol, said chlorine gas being employed in an amount of from one to about two times the theoretical amount required on a molar basis and said chlorinating taking place at a temperature below 60°C;
    pouring the reaction mixture into water to transfer the 2-sulfo-4, 6-dichloro-5-methylphenol into the aqueous phase and form an extract; and
    reacting said 2-sulfo-4,6-dichloro-5-methylphenol in said aqueous phase extract with nitric acid at a temperature below 50°C whereby the sulfonic group of said 2-sulfo-4,6-dichloro-5-methylphenol is replaced by a nitro group, said nitric acid being used in an amount of from one to about two times the theoretical amount on a molar basis.

2. The method according to claim 1, wherein said sulfuric anhydride complex is a complex of sulfur anhydride and a compound selected from the group consisting of dioxane, triethylamine and pyridine.

3. The method according to claim 1, wherein the sulfonation is carried out at a temperature above 60°C.

4. The method according to claim 3, wherein the sulfonation is carried out at a temperature between 70°C and 75°C.

5. The method according to claim 1, wherein the chlorination with chlorine gas is carried out in a halogenated hydrocarbon solvent.

6. The method according to claim 1, wherein said halogenated hydrocarbon solvent is an aliphatic halogenated hydrocarbon.

7. The method according to claim 6, wherein said aliphatic halogenated hydrocarbon is dichloroethane.

8. The method according to claim 6, wherein said aliphatic halogenated hydrocarbon is tetrachloroethane.

9. The method according to claim 2, wherein said sulfuric anhydride complex is a complex of sulfuric anhydride and dioxane.

10. The method according to claim 9, wherein the molar ratio of said sulfuric anhydride to said dioxane is 2:1.

11. The method according to claim 1, wherein said chlorinating is at a temperature of from about 45° to 55°C.

* * * * *